United States Patent Office 3,204,183
Patented Aug. 31, 1965

3,204,183
HOT LINE INDICATOR USING A CAPACITIVE PROBE WHOSE OUTPUT CONTROLS SWITCHING CIRCUIT MEANS FOR AN OSCILLATOR OUTPUT CIRCUIT
Ernest L. Hasenzahl, 6609 Lochinvar Drive, Baltimore 20, Md.
Filed Nov. 10, 1960, Ser. No. 68,511
2 Claims. (Cl. 324—133)

This invention relates to a transistorized audible high voltage tester for detecting high voltage in circuits and equipment in the A.C. generation and transmission lines of the electric power companies. It has been used on 60 cycle and 25 cycle lines on voltages from 440 volts to 230 kv.

In its essential the tester embodies a circuit of a copper disc which serves as one plate of a condenser, the earth serving as the other plate, and it picks up a small signal in the electrostatic field surrounding the lines or equipment under test. It is intended that the copper disc should be within the field but not in contact with the conductor. Conductors with metallic sheaths or shields could not be tested with this device although other types of insulation do not interfere with the test. The A.C. signal passes from the copper disc through a transistorized amplifier, then through an interstage transformer to a triggering transistor, to a transistor tone generator and output transformer to a loudspeaker with a small dry cell battery to give the tester sufficient power, making the volume of the speaker independent of the strength of the input signal.

Among the objects of the invention are that it should fail safe, if it is used with the standard test procedure of live-dead-live which indicates positively the condition of the tester, as no signal is given when the conductor is dead or the device is not working. Another object is that the touching of a live conductor is not required, thereby eliminating a serious safety hazard. By proper construction the tester is arranged to fit over the head of a switch stick for the safe testing of all voltages and frequencies in use by all power companies. The tester provides a reliable and distinctive indication of the presence of an A.C. potential under all conditions. It is not affected by voltages of adjacent phases or circuits. It is adaptable for use on all types of electric equipment in substations and transmission lines. It is light in weight and its minimum bulk makes handling easy. Its rugged construction will withstand field use and since its internal components are likewise rugged they will have a relatively long life. Since the tone varies with the input signal, both 25 and 60 cycle systems can be tested without any adjustment and due to the variation of tone, the circuits can be identified. As the voltage increases, the possible distance between the conductor and the tester increases, the probe of the tester is adaptable for placement within two inches to five feet of the conductor, in which distances it receives ample energy from the electrostatic field for the operation of the audible tester. The above and other objects and advantages of the invention will be apparent from the following description and the accompanying drawings forming a part hereof and in which:

In the drawings similar numerals refer to similar parts throughout the several views.

Figure 1:
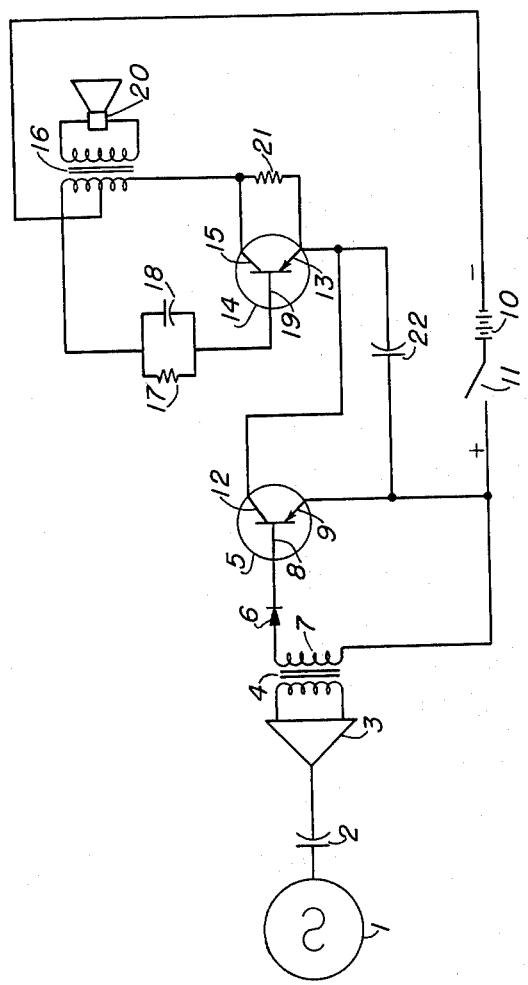
FIGURE 1 shows one embodiment of a circuit for the tester.

In FIGURE 1 the copper disc probe 1 is connected through the condenser 2 to the transistor amplifier 3 whose output is fed to the interstage transformer 4 which provides proper impedance matching between the amplifier 3 and the transistor 5, it also prevents the triggering action of transistor 5 in the absence of a signal through diode 6. The signals pass from the secondary 7 of transformer 4 through diode 6 to the base 8 of transistor 5. The emitter 9 of transistor 5 is connected to the positive side of battery 10 through switch 11. Diode 6 will give half wave rectification of the applied A.C. signal and the resultant D.C. voltage to the base 8 of transistor 5 will cause current to flow from emitter 9 to collector 12, the transistor 5 giving a triggering action. Capacitor 22 provides the necessary impedance to the transistor 14 and prevents any D.C. voltage from battery 10 appearing at emitter 13. Current passing from collector 12 to emitter 13 and capacitor 22 will cause transistor 14 to function and current will be supplied to the primary side of transformer 16 from the collector 15. Since transformer 16 provides the necessary feedback to sustain oscillation, this oscillation will be generated in the network of resistor 17 and capacitor 18. This oscillation is amplified by transistor 14 from base 19 and will result in a tone at speaker 20 from the secondary side of transformer 16. This tone is the result of the half wave rectification of the input A.C. signal and the sine waves of the network 17 and 18. Resistor 21 provides additional load for collector 15 of transistor 14. Temperature compensation is provided for transistors 5 and 14 due to the low resistance of the windings of transformers 4 and 16.

It will be apparent that the intensity of the volume on the speaker 20 may be varied by a change in the voltage of the battery 10.

Figure 2:
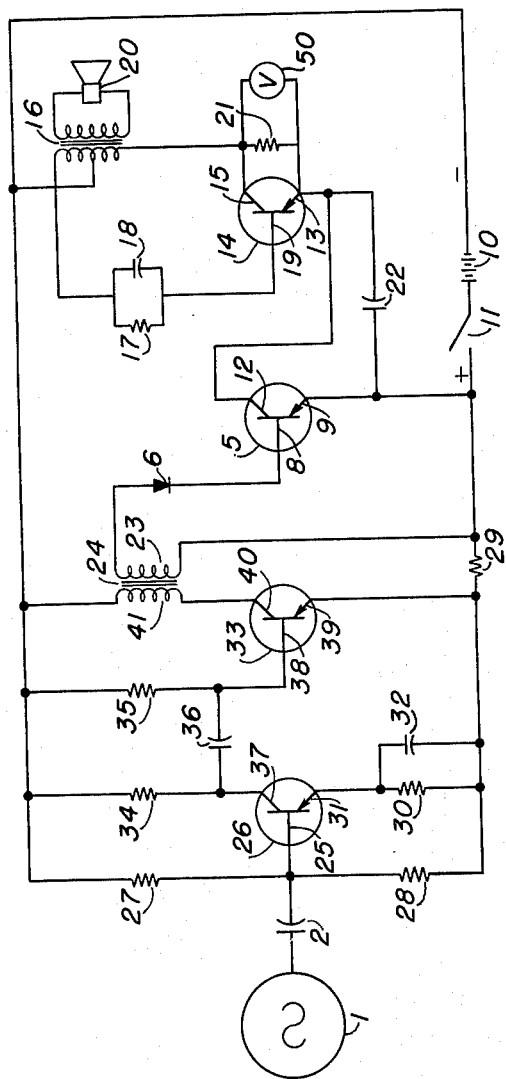
FIGURE 2 shows a more complete circuit for the transistor amplifier of FIGURE 1.

The circuit shown in FIGURE 2 is like that described above in its operation beginning with the secondary 23 of the transformer 24, which correspond to the secondary 7 and transformer 4, respectively of FIGURE 1. In this circuit the copper disc when in the electrostatic field passes a minute amount of current to base 25 of transistor 26 through capacitor 2. The base 25 of transistor 26 receives the proper voltage through resistors 27, 28, 29 and switch 11. Resistor 30 will temperature stabilize the current of emitter 31 and capacitor 32 bypasses the A.C. signal around resistor 30. Transistor 26 is matched to transistor 33 by the RC network of resistors 34, 35 and capacitor 36, allowing the signal to pass from the collector 37 to the base 38 of transistor 33. Emitter 39 is connected to the positive side of battery 10, resistor 29 will drop the voltage of battery 10 to the proper voltage for transistors 26 and 33. The amplified signal will now pass from the collector 40 to the primary winding 41 of transformer 24 which provides the proper impedance matching to transistor 5. From the secondary 23 of transformer 24 the action of this circuit is the same as that in FIGURE 1, with battery 10 being likewise connected to the primary 41 of transformer 24 and the resistors 27, 34 and 35. If desired a voltmeter 50 to indicate the strength of the input signal or a relay to actuate switching devices could be connected between the emitter 13 and the collector 15, instead of or in addition to the resistor 21.

The circuit and apparatus above described can readily be placed in a tube of high dielectric strength, about two and one half inches in diameter and eight inches in length on a suitable chassis, and weighs about one and one-half pounds, with the copper disc probe at one end and the speaker at the other end, this tube is fastened at its side to another tube of smaller diameter and the smaller tube, having a proper size slot cut down its length can be slipped over the head of a switchstick of substantially any desired length to reach the high tension lines under test. It will be apparent from the above description that no other connection is required for its operation. The device is completely self-contained and only the probe need be placed within the electrostatic field of the conductor under test to determine if that conductor is alive, in which event an audible sound will be given by the speaker. When testing voltages below 440 volts the probe must make physical contact with the bare conductor to cause the device to function as described. In such a test, since only one lead of a circuit is contacted, danger from electrical shock is substantially eliminated.

While a preferred embodiment of the invention has been illustrated and described, it is to be understood that that the invention is not limited thereto but contemplates such modifications and further embodiments as may occur to those skilled in the art.

What is claimed as new and is desired to be secured by Letters Patent is:

1. An alternating current voltage potential tester circuit free from external conductor connection comprising a capacitive probe adapted for placement in the electrostatic field of a conductor under test and spaced therefrom, said probe being connected through a capacitor to a transistor amplifier whose output is connected to a transformer primary, the secondary thereof having one end connected through a half wave diode to the base of a first transistor and the other end connected to the positive side of a battery, the emitter of said first transistor being connected to the positive side of the said battery and through a capacitor to the emitter of a second transistor, a direct connection between the collector of the first transistor and the emitter of the second transistor, a speaker having a transformer primary with one end connected through a resistor and capacitor in parallel with the base of said second transistor and the other end connected to the collector of said second transistor, a resistor load connected between the emitter and collector of said second transistor, and a conductor leading from a tap on said speaker transformer primary back to the negative side of said battery, whereby input signals picked up by the probe cause said speaker to be activated at the frequency of said input signal to indicate the presence of potential in said conductor under test.

2. The subject matter as claimed in claim 1, and including a meter connected across said resistor load.

References Cited by the Examiner
UNITED STATES PATENTS

| | | | |
|---|---|---|---|
| 2,109,189 | 2/38 | Bly | 324—52 |
| 2,698,921 | 1/55 | Wharton | 324—52 |
| 2,942,189 | 6/60 | Shea | 324—133 |
| 3,009,099 | 11/61 | Muller | 324—52 |
| 3,029,383 | 4/62 | Douglas | 324—51 |
| 3,067,364 | 12/62 | Rosso | 340—258 |

FOREIGN PATENTS

| | | |
|---|---|---|
| 588,420 | 5/47 | Great Britain. |
| 48,434 | 9/30 | Norway. |

OTHER REFERENCES

Electronics Publication, pages 63–65 of Electronics Enginering Edition Magazine, May 9, 1958.

WALTER L. CARLSON, *Primary Examiner.*

ELI J. SAX, *Examiner.*